US009012054B2

(12) United States Patent
Tokunaga et al.

(10) Patent No.: US 9,012,054 B2
(45) Date of Patent: Apr. 21, 2015

(54) SECONDARY BATTERY, BATTERY PACK, ELECTRONIC APPARATUS, ELECTRIC TOOL, ELECTRIC VEHICLE, AND POWER STORAGE SYSTEM

(75) Inventors: Takashi Tokunaga, Fukushima (JP); Hironobu Fukahori, Fukushima (JP)

(73) Assignee: Sony Corporation, Tokyo (JP)

( * ) Notice: Subject to any disclaimer, the term of this patent is extended or adjusted under 35 U.S.C. 154(b) by 511 days.

(21) Appl. No.: 13/312,521

(22) Filed: Dec. 6, 2011

(65) Prior Publication Data

US 2012/0145428 A1    Jun. 14, 2012

(30) Foreign Application Priority Data

Dec. 13, 2010    (JP) ................. P2010-276716

(51) Int. Cl.
*H01M 10/04* (2006.01)
*H01M 10/42* (2006.01)

(52) U.S. Cl.
CPC .......... *H01M 10/0431* (2013.01); *H01M 10/42* (2013.01); *H01M 2010/4292* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 5,683,834 A | 11/1997 | Fujimoto et al. | |
| 2006/0046145 A1 | 3/2006 | Inoue et al. | |
| 2006/0115736 A1 | 6/2006 | Hashimoto et al. | |
| 2008/0176140 A1 | 7/2008 | Nishiyama et al. | |
| 2008/0286641 A1* | 11/2008 | Yonishi | 429/100 |
| 2011/0136008 A1* | 6/2011 | Hirose et al. | 429/213 |
| 2011/0287288 A1* | 11/2011 | Hina et al. | 429/94 |

FOREIGN PATENT DOCUMENTS

| | | |
|---|---|---|
| CN | 101079500 | 11/2007 |
| CN | 101318917 | 12/2008 |
| CN | 101855753 | 10/2010 |
| JP | 08-130035 | 5/1996 |
| JP | 3131976 | 11/2000 |
| JP | 2005-310617 | 11/2005 |
| JP | 2006-024464 | 1/2006 |

(Continued)

OTHER PUBLICATIONS

Notification of the First Office Action issued in connection with Chinese Patent Application No. 2011104015341, dated Dec. 17, 2014. (18 pages).

*Primary Examiner* — Ula C. Ruddock
*Assistant Examiner* — Tony Chuo
(74) *Attorney, Agent, or Firm* — K&L Gates LLP

(57) ABSTRACT

A secondary battery including: spirally wound electrode body in which positive electrode and negative electrode are laminated via separator and spirally wound, wherein the positive electrode includes an inner circumference side positive electrode active material layer and an outer circumference side positive electrode active material layer while including a single side active material layer formation region, the ratio A/(A+B) of an area density A of the inner circumference side positive electrode active material layer and an area density B of the outer circumference side positive electrode active material layer, an inner diameter C of the coil opening portion, and the ratio D/E of a thickness D of the positive electrode and a thickness E of the positive electrode collector satisfy the relationship expressed in Formula 1, and a length F of the single side active material layer formation region satisfies the relationship expressed in Formula 2.

11 Claims, 5 Drawing Sheets

(56) References Cited

FOREIGN PATENT DOCUMENTS

| JP | 2006-059771 | 3/2006 |
| JP | 2006-134762 | 5/2006 |
| JP | 2006-134763 | 5/2006 |
| JP | 2008-004531 | 1/2008 |

* cited by examiner

SECONDARY BATTERY, BATTERY PACK, ELECTRONIC APPARATUS, ELECTRIC TOOL, ELECTRIC VEHICLE, AND POWER STORAGE SYSTEM

CROSS REFERENCES TO RELATED APPLICATIONS

The present application claims priority to Japanese Priority Patent Application JP 2010-276716 filed in the Japan Patent Office on Dec. 13, 2010, the entire content of which is hereby incorporated by reference.

BACKGROUND

The present application relates to a secondary battery that includes a spirally wound electrode body in which a positive electrode and a negative electrode are laminated and spirally wound via a separator, and a battery pack, an electronic apparatus, an electric tool, an electric vehicle, and a power storage system that use such a secondary battery.

In recent years, electronic apparatuses typified by mobile terminal apparatuses and the like have been popularized, and there is demand for such apparatuses to be further miniaturized, lightened, and to have a longer service life. Accordingly, the development of a battery, particularly a secondary battery that is small, light, and able to obtain a high energy density as a power source has been pursued. Further, with secondary batteries, application for uses in large sizes such as for automobiles is also being considered, and wide applications for other uses is also being considered.

As a secondary battery, the use of a variety of elements as the carrier (material that reciprocates between the positive electrode and the negative electrode during charging and recharging) is being researched. Among such secondary batteries, there are great expectations on a secondary battery that uses lithium as the carrier, specifically, a lithium ion secondary battery that uses the absorption and the discharge of the lithium as a charging and discharging reaction. The reason is that it is possible to obtain a higher energy density than a lead battery or a nickel cadmium battery.

A secondary battery includes a spirally wound electrode body that is the so-called cell element, and the spirally wound electrode body is composed by a positive electrode and a negative electrode that are laminated via a separator and spirally wound. The positive electrode includes a positive electrode active material layer that is formed on a positive electrode collector, and the negative electrode includes a negative electrode active material layer that is formed on a negative electrode collector.

Incidentally, recently, accompanying the rapid increase in performance and functionality of electronic apparatuses and the like, there is a strong demand to further improve the performance of secondary batteries, particularly to increase capacity. Accompanying such a demand, in order to increase the charging and discharging capacity of a positive electrode and a negative electrode, if a high capacity material is used as the negative electrode active material that is included in the negative electrode active material layer, there is accordingly cause to increase the thickness of the positive electrode active material layer. Further, in order to increase the volume occupied by the positive electrode and the negative electrode in the secondary battery, if the thickness of the positive electrode collector and the separator are reduced, the thicknesses of the positive electrode active material layer and the negative electrode active material layer are accordingly increased.

However, if the thickness of the positive electrode active material layer is increased, the flexibility of the positive electrode active material layer thereof decreases. Therefore, if the positive electrode is spirally wound around a coil core rod along with the negative electrode and the like when creating the spirally wound electrode body, the positive electrode in the vicinity of the center where the radius of curvature is small becomes prone to fracturing. Such a tendency becomes particularly striking the smaller the outer diameter of the coil core rod is made in order to increase the volume occupied by the positive electrode and the negative electrode within the secondary battery.

Therefore, in order to suppress fracturing of the positive electrode when coiling, a variety of countermeasures and related techniques have been proposed. Specifically, when creating a flat coil group composed of substantially straight portions and curved portions by coiling a positive electrode plate or the like, causing a solvent to contact portions that correspond to the curved portions of the positive electrode plate and lowering the positive electrode plate density of the curved portions to be lower than the positive electrode plate density of the substantially straight portions has been proposed (for example, refer to Japanese Unexamined Patent Application Publication No. 2005-310617). Causing the application thickness of an electrode compound that is applied to the inside to be thinner than the application thickness of the electrode compound that is applied to the outside when coiling a sheet-shaped electrode is proposed (for example, refer to Japanese Unexamined Patent Application Publication No. 08-130035). Including a predetermined amount of a copolymer of vinylidene fluoride, tetrafluoroethylene, and hexafluoropropylene as a binder on the positive electrode active material layer has been proposed (for example, refer to Japanese Unexamined Patent Application Publication No. 2006-059771). Out of the binder layers (inner circumference layer and outer circumference layer) that are provided on both sides of the collector, causing the thickness of the outer circumference layer to be greater than the thickness of the inner circumference layer and causing the active material amount of the outer circumference side to be greater than the active material amount of the inner circumference layer has been proposed (for example, refer to Japanese Patent No. 3131976). In a positive electrode collector after recharging one or more times, causing the coefficient of extension until fracturing in the coiling direction to be equal to or greater than 3% has been proposed (for example, refer to Japanese Unexamined Patent Application Publication No. 2006-134762).

Further, out of an outer surface positive electrode active material layer and an inner surface positive electrode active material layer that are provided on both sides of the positive electrode collector, causing the thickness of the inner surface positive electrode active material layer to be less than the thickness of the outer surface electrode active material layer and providing an outer surface active material region in which only the outer surface active material layer is provided on a position that overlaps a lead on the coil center side of the positive electrode has been proposed (for example, refer to Japanese Unexamined Patent Application Publication No. 2008-004531). Out of an inner side positive electrode active material layer and an outer side positive electrode active material layer that are provided on the positive electrode body, causing the center angle of an end portion on a coil center side of the outer side positive electrode active material layer and an end portion on a coil center side of the inner side positive electrode active material layer to the coil center to be equal to or greater than 72° and providing a positive electrode lead so as to avoid a region in which the center angle from the end portion of the coil center side of the inner side positive electrode active material layer to be within 30° in the coil direction and within 30° in the opposite direction to the coil direction has been proposed (for example, refer to Japanese Unexamined Patent Application Publication No. 2006-134763). Providing an outer circumference side opposing region in which the negative electrode active material layer and the positive electrode active material layer are opposing in only the outer circumference surface side to be within a range of equal to or more than 2 revolutions and equal to or less than 3.25 revolutions on the coil center side of the negative electrode has been proposed (for example, refer to Japanese Unexamined Patent Application Publication No. 2006-024464).

SUMMARY

Although a variety of measures and the like have been proposed to suppress the fracturing of the positive electrode when coiling, there is cause, naturally, to not only suppress the fracturing of the positive electrode but to also secure the battery characteristics such as the battery capacity or the cycle characteristics. The reason is that even if fracturing of the positive electrode is able to be suppressed, if the usual performance of the battery is lowered, it is difficult to meet the demand for further improvements in the performance of secondary batteries. In particular, in order to realize higher capacity, being able to suppress fracturing of the positive electrode even when the outer diameter of the coil core rod is reduced and the volume occupied by the positive electrode and the negative electrode within the secondary battery is increased while the thickness of the positive electrode collector is reduced and the thickness of the positive electrode active material layer is relatively increased is ideal.

Here, as described above, including a binder (copolymer) in the positive electrode active material layer has already been proposed. However, in such a case, although fracturing of the positive electrode is suppressed since the flexibility of the positive electrode active material layer increases, since the adhesiveness of the positive electrode active layer to the positive electrode collector is reduced if the thickness of the positive electrode active material layer is increased, the positive electrode active material layer becomes prone to fall off from the positive electrode collector. On the other hand, if the addition amount of the binder is increased in order to improve the adhesiveness, since the flexibility of the positive electrode active material layer is decreased, fracturing of the positive electrode is caused.

It is desirable to provide a secondary battery that is able to obtain excellent battery characteristics while suppressing fracturing of a positive electrode when coiling, and a battery pack, an electronic apparatus, an electric tool, and electric vehicle, and a power storage system.

A secondary battery of an embodiment includes a spirally wound electrode body in which a positive electrode and a negative electrode are laminated via a separator and spirally wound with a center opening portion of the spirally wound electrode body as the center so that the positive electrode is arranged more to an inner circumference side than the negative electrode. The positive electrode includes an inner circumference side positive electrode active material layer and an outer circumference side positive electrode active material layer. Further, the positive electrode includes a single side active material layer formation region in which only the outer circumference side positive electrode active material layer is formed on the positive electrode collector on an end portion of the positive electrode current collector. The ratio A/(A+B) of an area density A (mg/cm$^2$) of the inner circumference side positive electrode active material layer and an area density B (mg/cm$^2$) of the outer circumference side positive electrode active material layer, an inner diameter C (mm) of the coil opening portion, and the ratio D/E of a thickness D (μm) of the positive electrode and a thickness E (μm) of the positive electrode collector satisfy the relationship expressed in Formula 1 below. Further, a length F (mm) of the single side active material layer formation region satisfies the relationship expressed in Formula 2 below. Here, a battery pack, an electronic apparatus, an electric tool, an electric vehicle, and a power storage system of embodiments of the disclosure use the secondary battery described above.

$$0.380 \leq A/(A+B) \leq [0.593-0.007\times(D/E)]\times(0.03\times C+0.87). \quad \text{(Formula 1)}$$

(wherein C is $2.5 \leq C \leq 4$ and D/E is $13.333 \leq D/E \leq 20$)

$$[0.3\times(D/E)^2 - 7\times(D/E)+45] \leq F \leq 50 \quad \text{(Formula 2)}$$

According to the secondary battery of the embodiment, the ratio A/(A+B) of the area density A of the inner circumference side positive electrode active material layer and the area density B of the outer circumference side positive electrode active material layer, the inner diameter C of the coil opening portion, the ratio D/E of the thickness D of the positive electrode and the thickness E of the positive electrode collector, and the length F of the single side active material formation region satisfy the relationships shown in Formulae 1 and 2. In such a case, the relationship between the area densities A and B in the relationship with the inner diameter C and the thicknesses D and E is optimized, and the length F in the relationship between the thicknesses D and E is optimized. Therefore, even when the inner diameter C is decreased (C=2.5 mm to 4 mm) in order to increase the volume occupied by the positive electrode within the secondary battery and the ratio D/E is increased (D/E=13.333 to 20) in order to increase the volume occupied by the inner circumference side positive electrode active material layer and the outer circumference side positive electrode active material layer within the positive electrode, the positive electrode is not easily fractured when coiling and battery capacity and cycle characteristics are secured. It is therefore possible to obtain excellent battery characteristics while suppressing fracturing of the positive electrode when coiling. Further, the same effects are able to be obtained by the battery pack, the electronic apparatus, the electric tool, the electric vehicle, and the power storage system of the embodiments of the disclosure which use the secondary battery described above.

Additional features and advantages are described herein, and will be apparent from the following Detailed Description and the figures.

DETAILED DESCRIPTION

The present application will be described below with reference to the drawings according to an embodiment.

<1. Secondary Battery>

Figure 1:
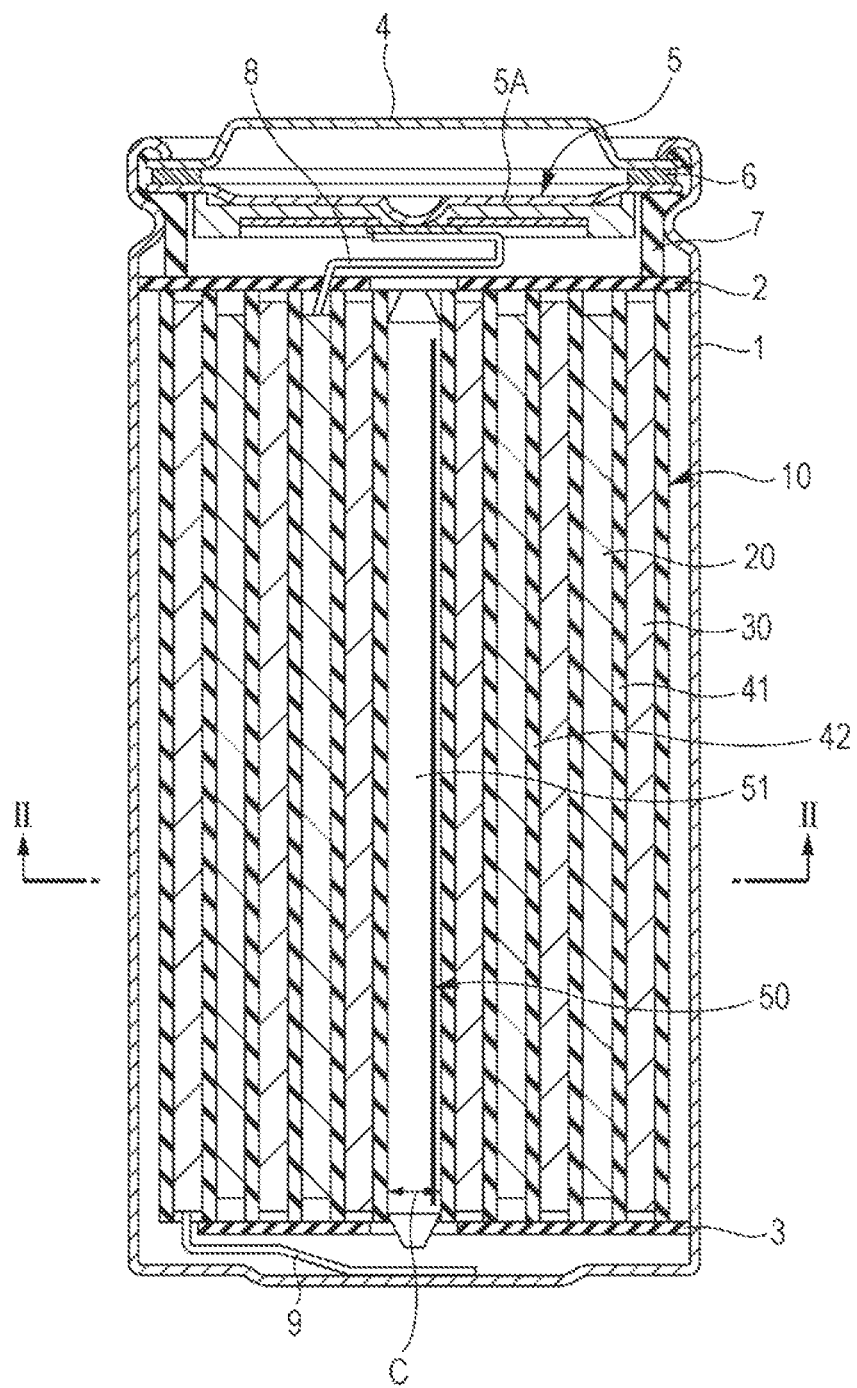
FIG. 1 is a cross-sectional diagram that represents a configuration of a secondary battery of an embodiment.
Figure 2:
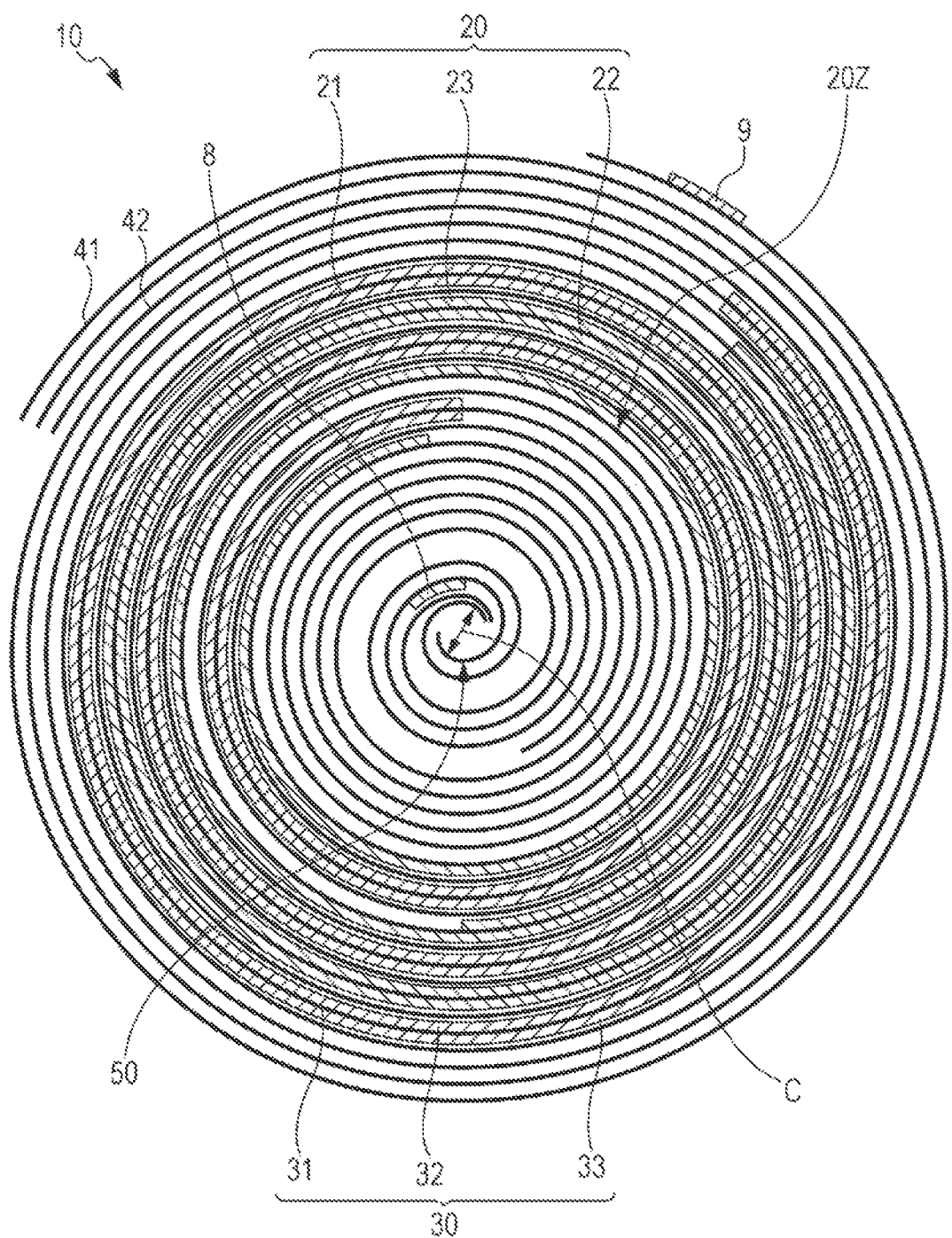
FIG. 2 is a cross-sectional diagram along line II-II of the spirally wound electrode body illustrated in FIG. 1.
Figure 3:
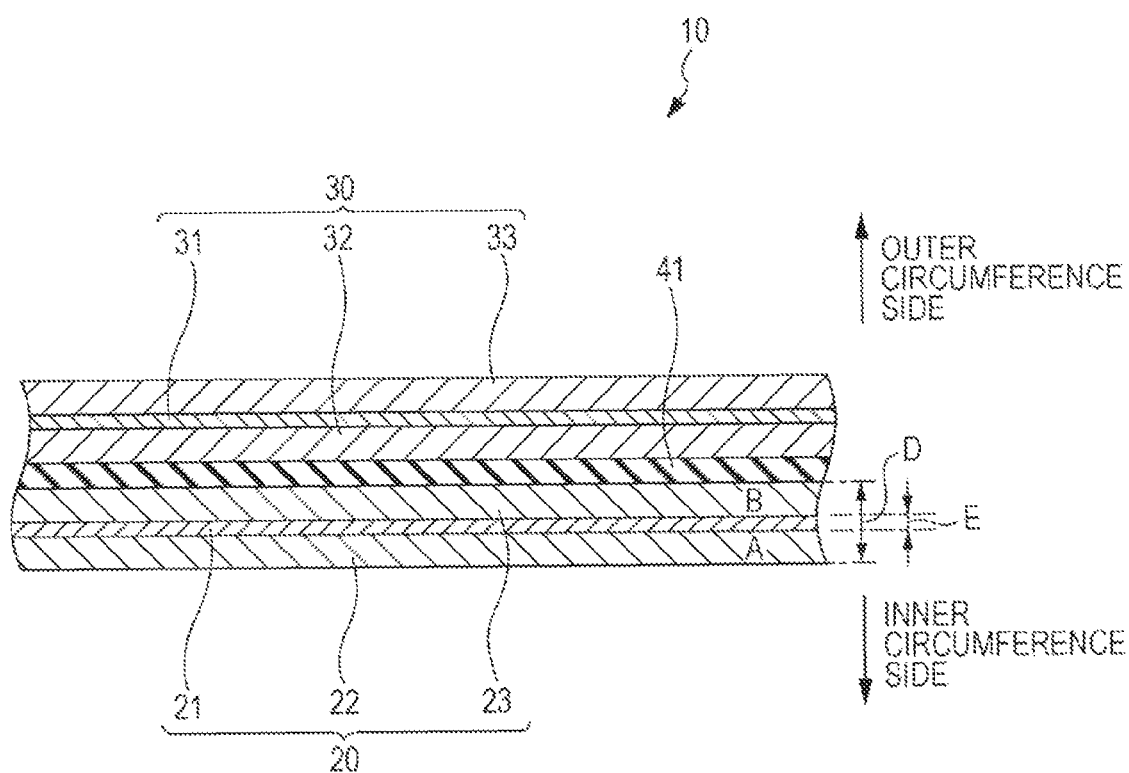
FIG. 3 is a cross-sectional diagram that represents a portion of the spirally wound electrode body illustrated in FIGS. 1 and 2.
Figure 4:
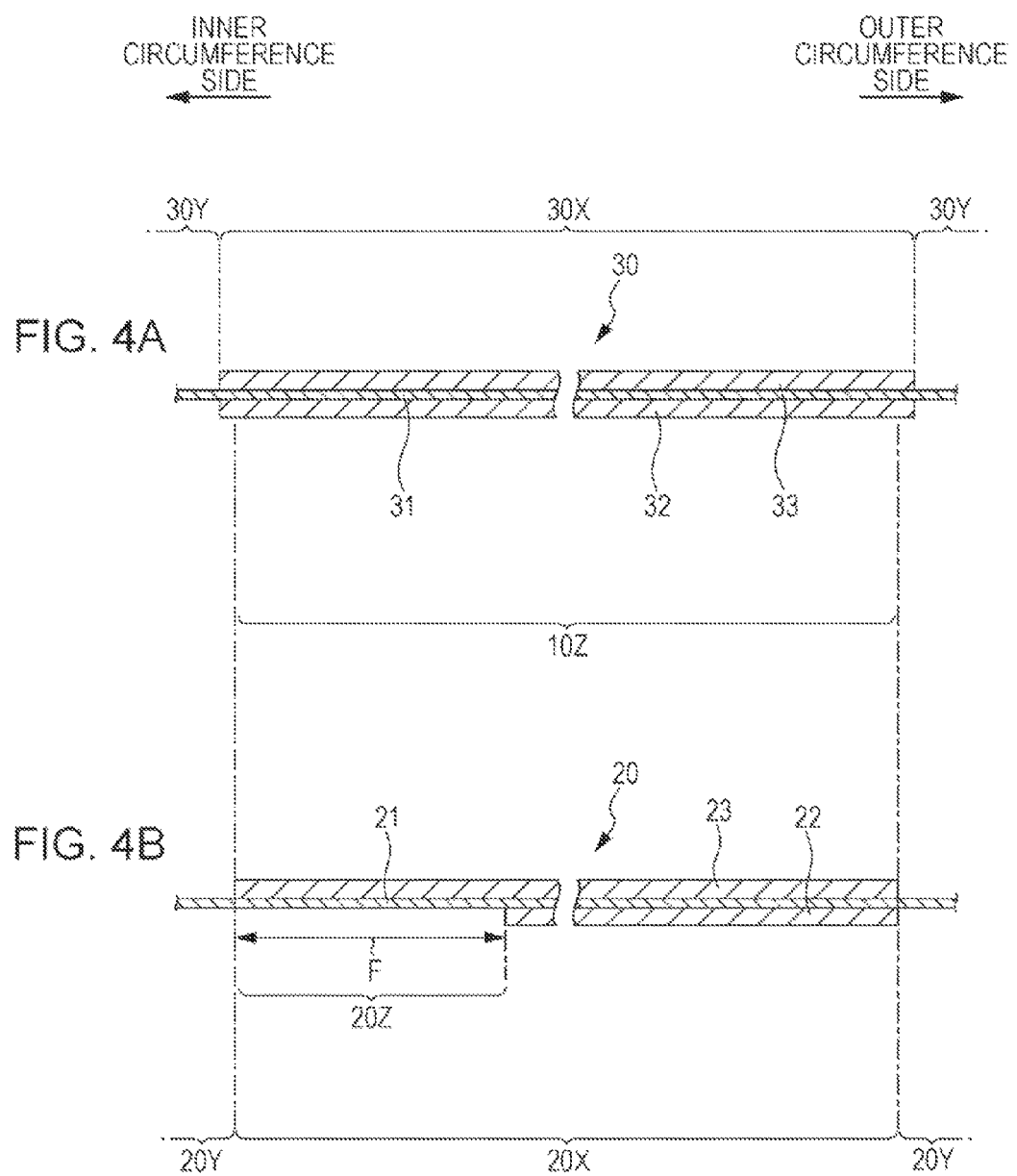
FIGS. 4A and 4B are cross-sectional diagrams that represent a portion of a positive electrode and a negative electrode illustrated in FIGS. 1 and 2.

FIGS. 1 to 4B represent a configuration of a secondary battery according to an embodiment. Of such diagrams, respectively, FIG. 1 illustrates an overall vertical cross-section, FIG. 2 illustrates a horizontal cross-section along line II-II of a spirally wound electrode body illustrated in FIG. 1, and FIG. 3 illustrates a cross-section of a portion of the spirally wound electrode body 10 illustrated in FIG. 2. Further, FIGS. 4A and 4B illustrate cross-sections of a portion of a negative electrode 30 (A) and a positive electrode 20 (B) illustrated in FIGS. 2 and 3.

The secondary battery described here is a lithium ion secondary battery in which the capacity of the negative electrode 30 is represented, for example, by the absorption and discharge of lithium that is an electrode reactant.

[Overall Configuration of Secondary Battery]

In such a secondary battery, as illustrated in FIG. 1, mainly, the spirally wound electrode body 10 and a pair of insulating plates 2 and 3 are stored inside a cylindrical battery casing 1. The battery shape that uses such a cylindrical battery casing 1 is known as a cylinder type.

The battery casing 1 is an external casing with a hollow structure in which one end portion is sealed while the other end portion is open, and is formed of a metallic material such as iron (Fe), aluminum (Al), or an alloy thereof. Here, in a case when the battery casing 1 is made of iron, the surface of the battery casing 1 may be plated by a metallic material such as nickel (Ni). The pair of insulating plates 2 and 3 are arranged so as to interpose the spirally wound electrode body 10 from above and below while extending vertically with respect to the coil circumference surface.

A battery lid 4, a safety valve mechanism 5, and a heat-sensitive resistance element (Positive Temperature Coefficient: PTC element) 6 are caulked via a gasket 7 in the opened end portion of the battery casing 1. The inside of the battery casing 1 is thereby sealed. The battery lid 4 is formed, for example, of the same material as the battery casing 1. The safety valve mechanism 5 and the heat-sensitive resistance element 6 are provided on the inner side of the battery lid 4, and the safety valve mechanism 5 is electrically connected to the battery lid 4 via the heat-sensitive resistance element 6. With the safety valve mechanism 5, if the internal pressure reaches a certain level or higher due to internal short-circuiting or heating from the outside, a disk plate 5A inverts and severs the electrical connection between the battery lid 4 and the spirally wound electrode body 10. The heat-sensitive resistance element 6 has a function of preventing abnormal heating due to a large current by using the increases in resistance corresponding to rises in temperature. The gasket 7 is formed, for example, of an insulating material, and asphalt may be applied on the surface thereof.

As illustrated in FIGS. 2 to 4B, the spirally wound electrode body 10 includes a positive electrode 20, a negative electrode 30, and a separator 41. The positive electrode 20 and the negative electrode 30 are laminated via the separator 41 and the laminated body is spirally wound with a coil opening portion 50 (inner diameter C: mm) as the center so that the positive electrode 20 is arranged more on the inner circumference side than the negative electrode 30. Here, the number of coils is able to be set arbitrarily. The coil opening portion 50 is a cylindrical space that is formed in the central portion of the coil electrode body 10, and a center pin 51 may be inserted in the coil opening portion 50. The outer diameter of the center pin 51 is approximately equal to the inner diameter C of the coil center portion 50.

Here, for example, the spirally wound electrode body 10 further includes an auxiliary separator 42, and the positive electrode 20, the separator 41, the negative electrode 30, and the auxiliary separator 42 are laminated and spirally wound to be arranged in such an order from the inner circumference side. Here, the outer diameter of the spirally wound electrode body 10 is, for example, equal to or greater than 12.8 mm and equal to or less than 18.4 mm.

A positive electrode lead 8 formed of a conductive material such as aluminum, for example, is connected to the positive electrode 20, and the positive electrode lead 8 is welded to the safety valve mechanism 5 and electrically connected to the battery lid 4. Further, a negative electrode lead 9 formed of a conductive material such as nickel, for example, is connected to the negative electrode 30, and the negative electrode lead 9 is welded to the battery casing 1.

[Positive Electrode]

As illustrated in FIGS. 2 to 4B, the positive electrode 20 (thickness D: μm) respectively has an inner circumference side positive electrode active material layer 22 (area density A: mg/cm$^2$) and an outer circumference side positive electrode active material layer 23 (area density B: mg/cm$^2$) on an inner circumference side surface and an outer circumference side surface of a strip-like positive electrode collector 21 (thickness E: μm). The inner circumference side surface is one surface that is positioned on the inner circumference side of the pair of opposing surfaces of the positive electrode collector 21, and the outer circumference side surface is the other surface that is positioned on the outer circumference side. Here, the thickness D is, for example, equal to or greater than 200 μm and equal to or less than 300 μm.

The positive electrode collector 21 is formed of a conductive material such as, for example, aluminum, nickel, or stainless steel. The inner circumference side positive electrode active material layer 22 and the outer circumference side positive electrode active material layer 23 include one or more of a positive electrode material that is able to absorb and discharge lithium as the positive electrode active material, and may also include other materials such as a positive electrode binder or a positive electrode conductive agent as necessary. Here, the thickness E is, for example, equal to or greater than 12 μm and equal to or less than 20 μm. The area density A is, for example, equal to or greater than 26 mg/cm$^2$ and equal to or less than 51 mg/cm$^2$, and the area density B is, for example, equal to or greater than 26 mg/cm$^2$ and equal to or less than 72 mg/cm$^2$.

The inner circumference side positive electrode active material layer 22 and the outer circumference side positive electrode active material layer 23 are formed, for example, on a central portion (active material layer formation region 20X) in the longitudinal direction of the positive electrode collector 21 to be opposing one another via the positive electrode collector 21. On the other hand, in an end portion region (inactive material layer formation region 20Y) where the inner circumference side positive electrode active material layer 22 and the outer circumference side positive electrode active material layer 23 are not formed, the positive electrode collector 21 is exposed. However, the positive electrode 20 includes a single side active material layer formation region 20Z (length P mm) on which only the outer circumference side positive electrode active material layer 23 is formed on an end portion of the positive electrode collector 21.

The positive electrode collector 21 in the inactive material layer formation region 20Y may, for example, be spirally wound by one revolution or two or more revolutions along with the separator 41 and the auxiliary separator 42 around one or both of the inner circumference side and the outer circumference side. Here, the positions of the end portions on the outer circumference side of the inner circumference side positive electrode active material layer 22 and the outer circumference side positive electrode active material layer 23, for example, match each other in the longitudinal direction of the positive electrode collector 21. However, the positions of the end portions may be deviated.

A lithium-containing compound is preferable as the positive electrode material. The reason is that it is then possible to obtain a high energy density. The lithium-containing compound is, for example, a composite oxide that includes lithium and a transition metal element as constituent elements, a phosphate compound that includes lithium and a transition metal element as constituent elements, or the like. Among such materials, a material that includes at least one of cobalt (Co), nickel (Ni), manganese (Mn), and iron (Fe) as the transition metal element is preferable. The reason is that a higher voltage is thereby obtained. The chemical formula thereof is expressed, for example, as $Li_xM1O_2$ or $Li_yM2PO_4$. M1 and M2 in the formulae represent the one or more transition metal elements. Although the values of x and y are different depending on the charging and discharging state, the values of x and y are usually $0.05 \leq x \leq 1.10$ and $0.05 \leq y \leq 1.10$.

The composite oxide that includes the lithium and the transition metal element is, for example, a lithium cobalt composite oxide ($Li_xCoO_2$), a lithium nickel composite oxide ($Li_xNiO_2$), the lithium nickel composite oxide series expressed in Formula 10, or the like. The phosphate compound that includes the lithium and the transition metal element is, for example, a lithium iron phosphate compound ($LiFePO_4$), a lithium iron manganese phosphate compound ($LiFe_{1-u}Mn_uPO_4$ (u<1)), or the like. The reason is that it is thereby possible to obtain a high battery capacity and to obtain excellent cycle characteristics. Here, the positive electrode material may be a material other than those described above. The material expressed by $Li_xM1_yO_2$ (M1 is at least one of nickel and the M expressed in Formula 1 (all metal elements including nickel and M), x is x>1, and y is arbitrary) or the like is an example.

$$LiNi_{1-x}M_xO_2 \qquad \text{(Formula 10)}$$

(M is at least one of cobalt, manganese, iron, aluminum, vanadium (V), tin (Sn), magnesium (Mg), titanium (Ti), strontium (Sr), calcium (Ca), zirconium (Zr), molybdenum (Mo), technetium (Tc), ruthenium (Ru), tantalum (Ta), tungsten (W), rhenium (Re), ytterbium (Yb), copper (Cu), zinc (Zn), barium (Ba), boron (B), chromium (Cr), silicon (Si), gallium (Ga), phosphorous (P), antimony (Sb), and niobium (Nb). x is 0.005<x<0.5.)

Otherwise, the positive electrode material may, for example, be an oxide, a disulfide, a chalcogenide, a conductive polymer, or the like. The oxide is, for example, titanium oxide, vanadium oxide, or manganese dioxide. The disulfide is, for example, titanium disulfide, molybdenum sulfide, or the like. The chalcogenide is, for example, niobium selenide or the like. The conductive polymer is, for example, sulfur, polyaniline, polythiophene, or the like.

The inner circumference side positive electrode active material layer 22 and the outer circumference side positive electrode active material layer 23 are formed, for example, by an application method, a calcination method (sintering method), or a method of using both. The application method is, for example, a method of applying by mixing a particle-like positive electrode active material with a positive electrode binder or the like and dispersing in an organic solvent or the like. The calcination method is, for example, a method of applying by the same procedures as in the application method before heating by a temperature that is higher than the melting point of the positive electrode binder or the like. As the calcination method, a common technique may be used. For example, an atmosphere calcination method, a reaction calcination method, or a hot press calcination method may be used.

The positive electrode binder is, for example, one or more of a synthetic rubber, a polymer material, or the like. The synthetic rubber is, for example, styrene-butadiene rubber, fluorinated rubber, ethylene propylene diene, or the like. The polymer material is, for example, polyvinylidene fluoride, polyimide, polyamideimide, polyacrylic acid, or lithium polyacrylate, or the like. Here, the mixing ratio of the positive electrode binder with respect to the positive electrode active material is, for example, equal to or greater than 2% and equal to or less than 5% by mass (equal to or greater than 2 parts and equal to or less than 5 parts of the positive electrode binder to 100 parts of the positive electrode active material). The reason is that if the ratio is less than 2%, the adhesion of the inner circumference side positive electrode active material layer 22 and the outer circumference side positive electrode active material layer 23 with respect to the positive electrode collector 21 decreases, and on the other hand, if the ratio is greater than 5%, there is a possibility of the energy density decreasing.

The positive electrode conductive agent is one or more of, for example, carbon materials such as graphite, carbon black, acetylene black, or ketjen black. Here, as long as the negative electrode conductive agent is a material with conductivity, the negative electrode conductive agent may be a metallic material, a conductive polymer, or the like.

Here, the ratio A/(A+B) of the area density A of the inner circumference side positive electrode active material layer 22 and the area density B of the outer circumference side positive electrode active material layer 23, the inner diameter C of the coil opening portion 50, and the ratio D/E of the thickness D of the positive electrode 20 and the thickness E of the positive electrode collector 21 satisfy the relationship expressed in Formula 1 below. Further, the length F of the single side active material layer region 20Z satisfies the relationship expressed in Formula 2 below. Here, the ratio A/(A+B) and the ratio D/E are both values that are rounded to the fourth decimal place, and the length F is a value that is rounded to the second decimal place.

$$0.380 \leq A/(A+B) \leq [0.593-0.007 \times (D/E)] \times (0.03 \times C + 0.87) \qquad \text{(Formula 1)}$$

(wherein C is $2.5 \leq C \leq 4$ and D/E is $13.333 \leq D/E \leq 20$)

$$[0.3 \times (D/E)^2 - 7 \times (D/E) + 45] \leq F \leq 50 \qquad \text{(Formula 2)}$$

The ratio A/(A+B) satisfies the relationship expressed in Formula 1 because since the relationship between the area densities A and B in the relationship between the inner diameter C and the thicknesses D is optimized, upon the creation process of the spirally wound electrode body 10, fracturing of the positive electrode 20 is suppressed when coiling and battery capacity and cycle characteristics are secured.

In detail, if the ratio A/(A+B) is small, since the absolute amount of the inner circumference side positive electrode active material layer 22 that is positioned on a side near the coil opening portion 50 decreases relative to the absolute amount of the outer circumference side positive electrode active material layer 23, there is a tendency that the positive electrode 20 does not easily fracture when coiling. However, if the ratio A/(A+B) is too small, since the balance between the absolute amount of the inner circumference side positive electrode active material layer 22 and the absolute amount of the outer circumference side positive electrode active material layer 23 deteriorates, if charging and discharging is repeated as the discharging capacity decreases, the discharging capacity decreases more easily. On the other hand, if the ratio A/(A+B) is too great, since the absolute amount of the inner circumference side positive electrode active material layer 22 increases relative to the absolute amount of the outer circumference side positive electrode active material layer 23, the positive electrode 20 becomes prone to fracturing when coiling. However, if the ratio A/(A+B) satisfies the relationship expressed in Formula 1, the ratio A/(A+B) is optimized from the point of view of suppressing fracturing of the positive electrode 20 and a decrease in the discharge capacity. Therefore, even when the thickness D is increased relative to the thickness E and the volume occupied by the inner circumference side positive electrode active material layer 22 and the outer circumference side positive electrode active material layer 23 within the secondary battery is increased, the electrode 20 does not easily fracture during coiling. Such a tendency of the positive electrode 20 becoming resistant to fracturing may be similarly obtained when, in particular, the inner diameter C is reduced and the radius of curvature of the positive electrode 20 that is spirally wound in the vicinity of the coil opening portion 50 is reduced. Moreover, since the area density A is less than the area density B and both the area densities A and B are sufficient, a high discharging capacity is obtained and the discharging capacity does not easily decrease even when charging and discharging is repeated.

Here, the inner diameter C is within the range described above in order to reduce the volume occupied by the coil opening portion 50, which represents a loss of space, within the secondary battery, and to increase the volume occupied by the positive electrode 20 and the negative electrode 30. Further, the ratio D/E is within the range described above in order to increase the thickness D relative to the thickness E and to increase the volume occupied by the inner circumference side positive electrode active material layer 22 and the outer circumference side positive electrode active material layer 23 within the positive electrode 20.

The length F satisfies the relationship expressed in Formula 2 because since the length F is optimized in the relationship between the thicknesses D and E, fracturing of the positive electrode 20 is suppressed when coiling and battery capacity and cycle characteristics are secured.

In detail, if the length F is too short, since there is too much of the inner circumference side positive electrode active material layer 22 in the vicinity of the coil opening portion 50 where the radius of curvature when coiling is the smallest, the positive electrode 20 is prone to fracturing. On the other hand, if the length F is too long, since the range within which the inner circumference side positive electrode active material layer 22 is reduced too much, the battery capacity is reduced. However, if the length F satisfies the relationship expressed in Formula 2, since the length F is optimized from the viewpoints of suppressing fracturing of the positive electrode 20 and securing battery capacity, even if the thickness D is increased relative to the thickness E, the positive electrode 20 does not easily fracture when coiling and a high discharging capacity is maintained.

In particular, the length F preferable satisfies the relationship expressed in Formula 3 below. The reason is that the cycle characteristics are then improved.

$$0.428 \leq A/(A+B) \leq [0.593-0.007 \times (D/E)] \times (0.03 \times C+0.87) \quad \text{(Formula 3)}$$

[Negative Electrode]

As illustrated in FIGS. 2 to 4B, for example, the negative electrode 30 respectively includes an inner circumference side negative electrode active material layer 32 and an outer circumference side negative electrode active material layer 33 on an inner circumference side surface and an outer circumference side surface of a strip-like negative electrode collector 31. Here, the thickness of the negative electrode 30 is, for example, equal to or greater than 66 μm and equal to or less than 123 μm.

The negative electrode collector 31 is formed of a conductive material such as, for example, copper, nickel, or stainless steel. The inner circumference side negative electrode active material layer 32 and the outer circumference side negative electrode active material layer 33 include one or more of a negative electrode material that is able to absorb and discharge lithium as the negative electrode active material, and may also include other materials such as a negative electrode binder or a negative electrode conductive agent as necessary. It is preferable that the dischargeable capacity of the negative electrode material be greater than the discharging capacity of the positive electrode 20 in order to suppress separating of the lithium metal when discharging. Here, the details relating to the negative electrode binder or the negative electrode conductive agent, for example, are respectively the same as those of the positive electrode binder and the positive electrode conductive agent. Here, the thickness of the negative electrode collector 31 is, for example, equal to or greater than 12 μm and equal to or less than 20 μm. The area density of the inner circumference side negative electrode active material layer 32 is, for example, equal to or greater than 7 mg/cm² and equal to or less than 13 mg/cm², and the area density of the outer circumference side negative electrode active material layer 33 is, for example, equal to or greater than 7 mg/cm² and equal to or less than 19 mg/cm². The mixing ratio of the negative electrode binder to the negative electrode active material is, for example, the same as the mixing ratio of the positive electrode binder to the positive electrode active material.

The inner circumference side negative electrode active material layer 32 and the outer circumference side negative electrode active material layer 33 are formed, for example, on a central portion (active material layer formation region 30X) in the longitudinal direction of the negative electrode collector 31 to be opposing one another via the negative electrode collector 31. On the other hand, in an end portion region (inactive material layer formation region 30Y) where the inner circumference side negative electrode active material layer 32 and the outer circumference side negative electrode active material layer 33 are not formed, the negative electrode collector 31 is exposed. It is preferable that the length of the active material layer formation region 30X (formation lengths of the inner circumference side negative electrode active material layer 32 and the outer circumference side negative electrode active material layer 33) be, for example, greater than the length of the active material layer formation region 20X (formation lengths of the inner circumference side positive electrode active material layer 22 and the outer circumference side positive electrode active material layer 23) in both the outer circumference side and the inner circumference side.

The negative electrode collector 31 in the inactive material layer formation region 30Y may, for example, be spirally wound by one revolution or more revolutions along with the separator 41 and the auxiliary separator 42 around one or both of the inner circumference side and the outer circumference side. Here, the positions of the end portions on the outer circumference side of the inner circumference side negative electrode active material layer 32 and the outer circumference side negative electrode active material layer 33 match the other and the positions of the end portions on the inner circumference side match the other in the longitudinal direction of the negative electrode collector 31. However, the positions of the end portions may be deviated.

It is preferable that the surface of the negative electrode collector 31 be roughened. The reason is that, due to the so-called anchor effect, the adhesiveness of the inner circumference side negative electrode active material layer 32 and the outer circumference side negative electrode active material layer 33 to the negative electrode collector 31 improves. In such a case, the surface of the negative electrode collector 31 may be roughened in at least a region that opposes the inner circumference side negative electrode active material layer 32 and the outer circumference side negative electrode active material layer 33. For example, there is a method of forming microparticles by an electrolysis process. The electrolysis process is a method of providing convexities and concavities by forming microparticles on the surface of the negative electrode collector 31 by electrolysis in an electrolysis tank. Copper foil that is created by an electrolytic method is generally referred to an electrolytic copper foil.

The negative electrode material is, for example, a carbon material. The reason is that since there is very little change in the crystalline structure when the lithium is absorbed and discharged, a high energy density and excellent cycle characteristics are able to be obtained. Further, it is because a carbon material also functions as the negative electrode conductive agent. The carbon material is, for example, graphatizable carbon, non-graphatizable carbon in which the surface interval of (002) surface is equal to or greater than 0.37 nm, or graphite in which the surface interval of (002) surface is equal to or less than 0.34 nm. More specifically, the carbon material is pyrolytic carbon, coke, a glassy carbon fiber, an organic polymer compound fiber, activated carbon, or carbon black. Among such materials, coke includes pitch coke, needle coke, and petroleum coke. The organic polymer compound fiber is a material in which a phenol resin, a furan resin, or the like is carbonized by being calcined at an appropriate temperature. Otherwise, the carbon material may be low-crystalline carbon or amorphous carbon that have been heated by approximately 1000° C. or lower. Here, the form of the carbon material may be any of a fiber form, a spherical form, a grain form, or a scaled form.

Further, it is preferable that a material (metallic material) include one or more of a metallic element or a semi-metallic element as a constituent element of the negative electrode material. The reason is that a high energy density is thereby obtained. The metallic material may be a single element, an alloy, or a compound of a metallic element or a semi-metallic element, may be two or more types thereof, or a material that includes at least one or more of phases thereof as a portion thereof. Here, an alloy in the embodiments of the disclosure includes, in addition to a material that includes two or more types of metallic elements, a material that includes one or more types of metallic elements and one or more types of semi-metallic elements. Further, an alloy may include a nonmetallic element. The structure of an alloy is a solid solution, a eutectic system (eutectic mixture), an intermetallic compound, a coexistence of two or more types thereof, or the like.

The metallic element or the semi-metallic element is, for example, a metallic element or a semi-metallic element that is able to form an alloy with lithium, and specifically, is one or more of the elements below. Such elements are magnesium (Mg), boron (B), aluminum (Al), gallium (Ga), indium (In), silicon (Si), germanium (Ge), tin (Sn), or lead (Pb). Furthermore, the materials are bismuth (Bi), cadmium (Cd), silver (Ag), zinc, hafnium (Hf), zirconium (Zr), yttrium (Y), palladium (Pd), or platinum (Pt). Among such materials, at least one of silicon and tin are preferable. The reason is that since silicon and tin have excellent abilities of absorbing and discharging lithium, a high energy density is obtained.

A material that includes at least one of silicon and tin may be a single element, an alloy, or a compound of silicon or tin, may be two or more types thereof, or a material that includes at least one or more of phases thereof as a portion thereof. Here, a single element is a single element in a general sense (may include miniscule amounts of impurities), and does not necessarily mean a purity of 100%.

An alloy of silicon is a material that includes, for example, as a constituent element other than silicon, one or more of the elements below. Such elements are tin, nickel, copper, iron, cobalt, manganese, zinc, indium, silver, titanium, germanium, bismuth, antimony, or chromium. A compound of silicon is a material that includes, for example, as a constituent element other than silicon, oxygen or carbon. Here, a compound of silicon may include, for example, as a constituent element other than silicon, one or more of any of the elements described for an alloy of silicon.

The materials below are specific examples of alloys or compounds of silicon. Such materials are $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, or $TaSi_2$. Further, such materials are $VSi_2$, $WSi_2$, $ZnSi_2$, SiC, $Si_3N_4$, $Si_2N_2O$, $SiO_v$ ($0<v≤2$), or LiSiO. Here, v in $SiO_v$ may be $0.2<v<1.4$.

An alloy of tin is a material that includes, for example, as a constituent element other than tin, one or more of the elements below. Such elements are silicon, nickel, copper, iron, cobalt, manganese, zinc, indium, silver, titanium, germanium, bismuth, antimony, or chromium. A compound of tin is a material that includes, for example, as a constituent element other than tin, oxygen or carbon. Here, a compound of tin may include, for example, as a constituent element other than tin, one or more of any of the elements described for an alloy of tin. As an alloy or compound of tin, $SnO_w$ ($0<w≤2$), $SnSiO_3$, LiSnO, or $Mg_2Sn$ are given as examples.

In particular, a material that includes tin as a constituent element is, for example, preferably a material that includes tin as a first constituent element, and second and third constituent elements in addition. The second constituent element is, for example, one or more of any of the elements below. Such materials are cobalt, iron, magnesium, titanium, vanadium, chromium, manganese, nickel, copper, zinc, gallium, or zirconium. Further, such materials are niobium, molybdenum, silver, indium, cerium, hafnium, tantalum, tungsten, bismuth, or silicon. The third constituent element is, for example, one or more of boron, carbon, aluminum, or phosphorous. The reason is that by including the second and third constituent elements, a high battery capacity and excellent cycle characteristics are obtained.

Among such materials, a material that includes tin, cobalt, and carbon (SnCoC-containing material) is preferable. The composition of the SnCoC-containing material is, for example, 9.9 mass % to 29.7 mass % of the carbon content and the proportion of the content of the tin and the cobalt (Co/(Sn+Co)) is 20 mass % to 70 mass %. The reason is that a high energy density is obtained within such a composition range.

The SnCoC-containing material includes a phase containing tin, cobalt, and carbon, and the phase is preferably low-crystalline or amorphous. The phase is a reaction phase that is able to react with lithium, and excellent characteristics are obtained due to the presence of such a phase. The half-value width of the diffraction peak that is obtained by an X-ray diffraction of the phase preferably has, in a case when CuK alpha rays are used as specified X-rays and the insertion speed is 1°/min, a diffraction angle 2θ of equal to or greater than 1°. The reason is that the lithium is then absorbed and discharged more smoothly and the reactivity with the electrolyte solution is reduced. Here, there may be a case when the SnCoC-containing material includes, in addition to the low-crystalline or amorphous phase, a phase that includes a single element or a portion of each constituent element.

Whether or not the diffraction peak that is obtained by X-ray diffraction corresponds to a reaction phase that is able to react with lithium is easily determined by comparing the X-ray diffraction chart before and after an electrochemical reaction with the lithium. For example, if the position of the diffraction peak changes before and after the electrochemical reaction with the lithium, the diffraction peak corresponds to a reaction phase that is able to react with the lithium. In such a case, for example, the diffraction peak of the low-crystalline or amorphous reaction phase is seen between 2θ=20° to 50°. Such a reaction phase includes, for example, each of the constituent elements described above, and is mainly low-crystalline or amorphous due to the presence of carbon.

The SnCoC-containing material is preferably bound with a metallic element or a semi-metallic element in which at least a portion of the carbon that is a constituent element is another constituent element. The reason is that aggregation or crystallization of tin or the like is then suppressed. The bonding state of an element is able to be verified, for example, by an X-ray photoelectron spectroscopy (XPS) method. In a commercially available device, for example, an Al—K alpha ray, Mg—K alpha ray, or the like is used as a soft X-ray. In a case when at least a portion of the carbon is bound with a metallic element, a semi-metallic element, or the like, the peak of the synthetic wave of a 1s trajectory of the carbon (C1s) appears in a region that is lower than 284.5 eV. Here, energy calibration is performed so that the peak of a 4f trajectory of a gold atom (Au4f) is obtained at 84.0 eV. At this time, ordinarily, since there is surface contamination carbon on the material surface, the peak of C1s of the surface contamination carbon is 284.8 eV, which is used as the energy reference. In an XPS measurement, since the waveform of the peak of C1s is obtained in a form that includes the peak of the surface contamination carbon and the peak of the carbon within the SnCoC-containing material, for example, analysis is performed using commercially available software and the peak of each is separated. In the analysis of the waveform, the position of the main peak that is present on a minimum binding energy side is the energy reference (284.8 eV).

Here, the SnCoC-containing material may include other constituent elements as necessary. As such other constituent elements, one or more of silicon, iron, chromium, indium, niobium, germanium, titanium, molybdenum, aluminum, phosphorous, gallium, and bismuth are exemplified.

Other than such SnCoC-containing materials, a material that contains tin, cobalt, iron, and carbon (SnCoFeC-containing material) is also preferable. The composition of the SnCoFeC-containing material is able to be set arbitrarily. For example, the composition in a case when setting such that the content of the iron is relatively small is as below. The content of the carbon is between 9.9 mass % and 29.7 mass %, the content of the iron is between 0.3 mass % and 5.9 mass %, and the proportion of the content of the tin and the cobalt (Co/(Sn+Co)) is between 30 mass % and 70 mass %. Further, for example, the composition in a case when setting such that the content of the iron is relatively large is as below. The content of the carbon is between 11.9 mass % and 29.7 mass %. Further, the proportion of the content of the tin, the cobalt, and the iron ((Co+Fe)/(Sn+Co+Fe)) is between 26.4 mass % and 48.5 mass %, and the proportion of the content of the cobalt and the iron (Co/(Co+Fe)) is between 9.9 mass % and 79.5%. The reason is that a high energy density is obtained with such a composition range. The properties (half-value width and the like) of the SnCoFeC-containing material are the same as those of the SnCoC-containing material described above.

Otherwise, the negative electrode material may, for example, be a metal oxide or a polymer compound. A metal oxide is, for example, iron oxide, ruthenium oxide, molybdenum oxide, or the like. A polymer compound is, for example, polyacetylene, polyaniline, polypyrrole, or the like.

The negative electrode may be, naturally, materials other than those described above. Further, two or more types of the series of negative electrode materials described above may be mixed in arbitrary combinations.

The inner circumference side negative electrode active material layer 32 and the outer circumference side negative electrode active material layer 33 are formed, for example, by an application method, a vapor method, a liquid method, a spraying method, a calcining method, or two or more types thereof. The vapor method is, for example, a physical deposition method or a chemical deposition method, and specifically, is a vacuum vapor deposition method, a sputtering method, an ion plating method, a laser ablation method, a thermo-chemical vapor deposition method, a chemical vapor deposition (CVD) method, a plasma chemical vapor deposition method, or the like. The liquid method is, for example, an electrolytic plating method, an electroless plating method, or the like. The spraying method is a method of spraying the negative electrode active material in a molten or semi-molten state.

[Separator]

The separator 41 and the auxiliary separator 42 allow lithium ions to pass through while separating the positive electrode 20 and the negative electrode 30 and preventing the shirt-circuiting of electrical currents due to contact between the electrodes. The separator 41 and the auxiliary separator 42 may, for example, porous membranes of a synthetic resin, a ceramic, or the like, and may be a laminate of two or more types of such porous membranes. The synthetic resin is, for example, polytetrafluoroethylene, polypropylene, polyethylene terephthalate, polyethylene, or the like. Here, the thicknesses of the separator 41 and the auxiliary separator 42 are, for example, equal to or greater than 16 μm and equal to or less than 20 μm.

The separator 41 and the auxiliary separator 42 may coil around one or both of the inner circumference side and the outer circumference side of the spirally wound electrode body 10 over one revolution or two or more revolutions. However, the coiling state of the separator 41 and the auxiliary separator 42 on the outer circumference side is preferably set according to the type of electrode terminal for the battery casing 1 to perform a function. Specifically, in a case when the battery casing 1 functions as the same terminal (negative electrode terminal) as the electrode on the outer circumference side (negative electrode 30), in order to deliberately bring the negative electrode 30 and the battery casing 1 into contact in a case when a nail is struck in the secondary battery or the like, it is preferable that the separator 41 and the auxiliary separator 42 be not spirally wound excessively beyond the negative electrode collector 31 in the inactive material layer formation region 30Y. On the other hand, in a case when the battery casing 1 functions as a terminal that is a difference electrode (positive electrode) from the electrode on the outer circumference side (negative electrode 30), in order that the negative electrode 30 and the battery casing 1 are not positively brought into contact, it is preferable that the separator 41 and the auxiliary separator 42 be spirally wound in excess beyond the negative electrode collector 31 in the inactive material layer region 30Y.

[Electrolyte]

An electrolyte solution that is a liquid electrolyte is impregnated into the separator 41 and the auxiliary separator 42. The electrolyte solution includes a solvent and an electrolytic salt, and may also include other materials such as various types of additives as necessary.

The solvent is, for example, one or more of any of the below non-aqueous solvents (organic solvents). Such non-aqueous solvents are ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, or tetrahydrofuran. Further, the non-aqueous solvent is 2-methyltetrahydrofuran, tetrahydropyran, 1,3-dioxolane, 4-methyl-1,3-dioxolane, 1,3-dioxane, or 1,4-dioxane. Further, the non-aqueous solvent is methyl acetate, ethyl acetate, methyl propionate, ethyl propionate, methyl butyrate, methyl isobutyrate, methyl trimethyl acetate, or ethyl trimethyl acetate. Further, the non-aqueous solvent is acetonitrile, glutaronitrile, adiponitrile, methoxyacetonitrile, 3-methoxypropionile, N,N-dimethylformamide, N-methylpyrrolidone or N-methyl oxazolidinone. Further, the non-aqueous solvent is N,N'-dimethylimidazolidinone, nitromethane, nitroethane, sulfolane, trimethyl phosphate, or dimethylsulfoxide. The reason is that excellent battery capacity, cycle characteristics, storage characteristics, and the like are thus obtained.

Among such materials, at least one of ethylene carbonate, propylene carbonate, dimethyl carbonate, diethyl carbonate, and ethyl methyl carbonate is preferable. The reason is that further superior characteristics are thus obtained. In such a case, a combination of a solvent with a high viscosity (electric permittivity) such as ethylene carbonate or propylene carbonate (for example, relative permittivity $\epsilon \geq 30$) and a solvent with a low viscosity such as dimethyl carbonate, ethyl methyl carbonate, or diethyl carbonate (for example, viscosity $\leq 1$ mPa·s) is preferable. The reason is that the dissociability of the electrolytic salt and the mobility of ions are thus improved.

In particular, the solvent may be unsaturated carbon bond cyclic ester carbonate (cyclic ester carbonate including one or more unsaturated carbon bonds). The reason is that since a stable coating is formed on the surface of the negative electrode 30 when charging and discharging, the decomposition reaction of the electrolyte solution is suppressed. The unsaturated carbon bond cyclic ester carbonate is, for example, vinylene carbonate, vinyl ethylene carbonate, or the like. Here, the content of the unsaturated carbon bond cyclic ester carbonate in a non-aqueous solvent is, for example, equal to or more than 0.01 mass % and equal to or less than 10 mass %. The reason is that the decomposition reaction of the electrolyte solution is thus suppressed without excessively lowering the battery capacity.

Further, the solvent may be at least one of halogenated chained ester carbonate (chained ester carbonate with one or more halogen groups) or halogenated cyclic ester carbonate (cyclic ester carbonate with one or more halogen groups). The reason is that since a stable coating is thus formed on the surface of the negative electrode 30 when charging and discharging, the decomposition reaction of the electrolyte solution is suppressed. Although the types of halogen groups are not particularly limited, a fluorine group (—F), a chlorine group (—Cl), or a bromine group (—Br) are preferable, and a fluorine group is more preferable. The reason is that even greater effects are thus obtained. However, the number of halogen groups is preferably two rather than one, and may be three or more. The reason is that since a stronger and more stable coating is thus formed, the decomposition reaction of the electrolyte solution is further suppressed. The halogenated chained ester carbonate is, for example, fluoromethyl methyl carbonate, bis(fluoromethyl)carbonate, difluoromethyl methyl carbonate, or the like. The halogenated cyclic ester carbonate is 4-fluoro-1,3-dioxolan-2-one, 4,5-difluoro-1,3-dioxolan-2-one, or the like. Here, the content of the halogenated chained ester carbonate and the halogenated cyclic ester carbonate in the non-aqueous solvent is, for example, equal to or greater than 0.01 mass % and equal to or less than 50 mass %. The reason is that it is thus possible suppress the decomposition reaction of the electrolyte solution without excessively lowering the battery capacity.

Further, the solvent may be sultone (cyclic sulfonate). The reason is that the chemical stability of the electrolyte solution is improved. The sultone is, for example, propane sultone, propene sultone, or the like. Here, the content of the sultone within the non-aqueous solvent is, for example, equal to or greater than 0.5 mass % and equal to or less than 5 mass %. The reason is that it is thus possible suppress the decomposition reaction of the electrolyte solution without excessively lowering the battery capacity.

Furthermore, the solvent may be acid anhydride. The reason is that the chemical stability of the electrolyte solution is thus improved. The acid anhydride is, for example, dicarboxylic anhydride, disulfonic acid anhydride, carbonate sulfonic acid anhydride, or the like. The dicarboxylic anhydride is, for example, succinic anhydride, glutaric anhydride, maleic anhydride, or the like. The disulfonic acid anhydride is, for example, ethane disulfonic anhydride, propane disulfonic acid anhydride, or the like. The carbonate sulfonic acid anhydride is, for example, sulfobenzoic acid anhydride, sulfopropionic acid anhydride, sulfobutyric acid anhydride, or the like. Here, the content of the acid anhydride within the non-aqueous solution is, for example, equal to or greater than 0.5 mass % and equal to or less than 5 mass %. The reason is that it is thus possible to suppress the decomposition reaction of the electrolyte solution without excessively lowering the battery capacity.

[Electrolytic Salt]

The electrolytic salt is, for example, one or more of the lithium salts below. However, the electrolytic salt may be a salt other than lithium salt (for example, a light metal salt other than lithium salt).

The lithium salt is, for example, the compounds below. The lithium salt is lithium hexafluorophosphate ($LiPF_6$), lithium tetrafluoroborate ($LiBF_4$), lithium perchlorate ($LiClO_4$), or lithium hexafluoroarsenate ($LiAsF_6$). Further, the lithium salt is lithium tetraphenylborate ($LiB(C_6H_5)_4$), lithium methanesulfonate ($LiCH_3SO_3$), lithium trifluoromethanesulfonate ($LiCF_3SO_3$), or lithium tetrachloroaluminate ($LiAlCl_4$). Furthermore, the lithium salt is lithium hexafluorosilicate ($Li_2SiF_6$), lithium chloride (LiCl), or lithium bromide (LiBr). The reason is that excellent battery capacity, cycle characteristics, and storage characteristics are thus obtained.

At least one type out of the lithium hexafluorophosphate, lithium tetrafluoroborate, lithium perchlorate, and lithium hexafluoroarsenate is preferable, and lithium hexafluorophosphate is more preferable. The reason is that since internal resistance is thus reduced, even greater effects are obtained.

The content of the electrolytic salt is preferably equal to or greater than 0.3 mol/kg and equal to or less than 3.0 mol/kg with respect to the solvent. The reason is that high ion conductivity is thus obtained.

[Manufacturing Method of Secondary Battery]

The secondary battery is manufactured, for example, by the following techniques.

First, the positive electrode 20 is created. In such a case, after mixing a positive electrode binder or a positive electrode conductive agent as necessary with the positive electrode active material to create a positive electrode compound, the positive electrode compound is dispersed in an organic solvent or the like to form a paste-like positive electrode compound slurry. Next, the positive electrode compound slurry is applied on both surfaces of the positive electrode collector 21 before being dried, and the inner circumference side positive electrode active material layer 22 and the outer circumference side positive electrode active material layer 23 are formed. Finally, the inner circumference side positive electrode active material layer 22 and the outer circumference side positive electrode active material layer 23 are compression molded while being heated as necessary. The area densities A and B are adjustable by such compression molding. In such a case, the compression molding may be repeated a plurality of times.

Next, the negative electrode 30 is created by the same technique as the positive electrode 20 described above. In such a case, a negative electrode compound in which a negative electrode binder, a negative electrode conductive agent, or the like is mixed as necessary is dispersed in an organic solvent or the like, and a paste-like negative electrode compound slurry is formed. Next, the negative electrode compound slurry is applied on both surfaces A of the negative electrode collector 31 before being dried, and after the inner circumference side negative electrode active material layer 32 and the outer circumference side negative electrode active material layer 33 are formed, the inner circumference side negative electrode active material layer 32 and the outer circumference side negative electrode active material layer 33 are compression molded as necessary.

Here, the negative electrode 30 may be created by different techniques from the positive electrode 20. In such a case, for example, the negative electrode material is deposited on both surfaces of the negative electrode collector 31 using an evaporation method or a vapor method and the inner circumference side negative electrode active material layer 32 and the outer circumference side negative electrode active material layer 33 are formed.

Finally, the secondary battery is assembled using the positive electrode 20 and the negative electrode 30. In such a case, in addition to attaching the positive lead 8 to the positive electrode collector 21 by welding or the like, the negative lead 9 is attached to the negative electrode collector 31 by welding or the like. Next, after laminating the positive electrode 20, the separator 41, the negative electrode 30, and the auxiliary separator 42 in that order, the spirally wound electrode body 10 is created by coiling the positive electrode 20, the separator 41, the negative electrode 30, and the auxiliary separator 42 so that the positive electrode 20 is arranged more to the inner circumference side than the negative electrode 30. Next, after inserting a center pin 51 into the coil opening portion 50 of the spirally wound electrode body 10, the spirally wound electrode body 10 is placed inside the battery casing 1 while being interposed by the pair of insulating plates 2 and 3. In such a case, as well as attaching the positive electrode 8 to the safety valve mechanism 5 by welding or the like, the negative lead 9 is attached to the battery casing 1 by welding or the like. Next, the electrolyte solution is injected into the battery casing 1 and impregnated into the separator 41 and the auxiliary separator 42. Finally, the battery lid 4, the safety valve mechanism 5, and the heat-sensitive resistance element 6 are caulked via the gasket 7 on the opening end portion of the battery casing 1.

[Actions and Effects of Secondary Battery]

Such a secondary battery includes the spirally wound electrode body 10 in which the positive electrode 20 and the negative electrode 30 are laminated via the separator 41, and the positive electrode 20, the negative electrode 30, and the separator 41 are spirally wound with the coil opening portion 50 as the center such that the positive electrode 20 is arranged more on the inner circumference side than the negative electrode 30. The positive electrode 20 includes the inner circumference side positive electrode active material layer 22 and the outer circumference side positive electrode active material layer 23 that are formed on the positive electrode collector 21, and includes the single side active material layer formation region 20Z on an end portion of the positive electrode current collector. In particular, the ratio A/(A+B) of the area density A of the inner circumference side positive electrode active material layer 22 to the area density B of the outer circumference side positive electrode active material layer 23, the inner diameter C of the coil opening portion 50, the ratio D/E of the thickness D of the positive electrode 20 to the thickness E of the positive electrode 21, and the length F of the single side active material layer formation region 20Z satisfy the relationships expressed in Formulae 1 and 2.

In such a case, as described above, the relationship between the area densities A and B is optimized with the inner diameter C and the relationship between the thicknesses D and E, and the length F is optimized with the relationship between the thicknesses D and E. Therefore, even if the inner diameter C is decreased (C=2.5 mm to 4 mm) in order to increase the volume occupied by the positive electrode 20 within the secondary battery and the ratio D/E is increased (D/E=13.333 to 20) in order to increase the volume occupied by the inner circumference side positive electrode active material layer 22 and the outer circumference side positive electrode active material layer 23 within the positive electrode 20, fracturing of the positive electrode 20 when coiling in the creation process of the spirally wound electrode body 10 is suppressed, and the battery capacity and cycle characteristics are secured. It is therefore possible to obtain excellent battery characteristics while suppressing fracturing of the positive electrode 20 when coiling.

Furthermore, in order to suppress fracturing of the positive electrode 20, there is no cause to include a copolymerization agent (binder) in the inner circumference side positive electrode active material layer 22 and the outer circumference side positive electrode active material layer 23 as described in the techniques of the related art. It is therefore possible to also suppress the loss of the inner circumference side positive electrode active material layer 22 and the outer circumference side positive electrode active material layer 23 while suppressing fracturing of the positive electrode 20.

In particularly, of the length F satisfies the relationship formula expressed in Formula 3, the cycle characteristics are able to be further improved.

Further, even if a metallic material that is advantageous for a high capacity on the one hand but which is prone to expansion and contraction when charging and discharging or a material that includes at least one of silicon and tin in particular as the constituent element is used as the negative electrode active material of the negative electrode 30, it is possible to suppress fracturing of the positive electrode 20 due to the expansion and contraction of the negative electrode active material during charging and discharging.

<2. Uses of Secondary Battery>

Next, applied examples of the secondary battery described above will be described.

As long as the uses of the secondary battery are a machine, an apparatus, a tool, a device, or a system (aggregate of a plurality of apparatuses or devices) that is able to use the secondary battery as power for driving or as a power storage source for accumulating electric power, the uses of the secondary battery are not particularly limited. In a case when the secondary battery is used as a power source, the secondary battery may be a main power source (power source that is used preferentially) or an auxiliary power source (power source that is used instead of the main power source or by switching from the main power source). The type of main power source is not limited to secondary batteries.

As the uses of the secondary battery, for example, the uses below are exemplified. Such uses are electronic apparatuses such as a video camera, a digital still camera, a mobile phone, a notebook computer, a cordless phone, a headphone stereo, a mobile radio, a mobile television, or a mobile information terminal (PDA: Personal Digital Assistant). However, electronic apparatuses are not limited to the electronic apparatuses for mobile use as described above, and may be non-mobile use (stationary) electronic apparatuses. The use of the secondary battery includes household instruments such as an electric shaver, a backup device, a storage device such as a memory card, electric tools such as an electric drill or a chain saw, medical apparatuses such as a pace maker or a hearing aid, power sources such as a battery pack, electric vehicles such as an electric motorcar (including hybrid motorcars), and power storage systems such as a household battery system in which electric power is accumulated in case of emergency.

Among such uses, the secondary battery is effective in being applied to a battery pack, an electronic apparatus, an electric tool, an electric vehicle, a power storage system, or the like. The reason is that since there is demand for excellent characteristics for the secondary battery (battery capacity, cycle characteristics, and the like), it is possible to effectively improve such characteristics by using the secondary battery of the embodiments of the disclosure. Here, the battery pack includes, along with the secondary battery, for example, a control section that controls the secondary battery and an outer packaging that contains the secondary battery. The electronic apparatus operates the secondary battery as a power source for driving and executes various types of functions. The electric tool moves a movable portion (for example, a drill) with the secondary battery as the power source. The electric vehicle operates (travels) with the secondary battery as the power source, and as described above, may be a motorcar that also includes a power source other than the secondary battery (such as a hybrid motorcar). The power storage system is a system that uses the secondary battery as a power storage source. For example, in a household power storage system, electric power is accumulated in the second battery that is a power storage source, and as the power that is stored in the secondary battery is consumed according to demand, various types of apparatuses such as domestic electrical appliances become usable.

EXAMPLES

Examples of the embodiments of the disclosure will be described in detail.

Experiments 1 to 35

The cylindrical secondary battery (lithium ion secondary batter) illustrated in FIGS. 1 to 4B was created by the following steps.

First, the positive electrode 20 (thickness D: Tables 1 to 3) were created. In such a case, a lithium cobalt composite oxide ($LiCoO_2$) was obtained by mixing lithium carbonate ($Li_2CO_3$) and cobalt carbonate ($CoCO_3$) in a molar ratio of $Li_2CO_3:CoCO_3=0.5:1$ and calcining in air (900° C. ×5 hours). Next, after creating a positive electrode compound by mixing 91 parts by mass of the positive electrode active material ($LiCoO_2$), 3 parts by mass of the positive electrode binder (polyvinylidene fluoride), and 6 parts by mass of the positive electrode conductive agent (graphite), the positive electrode compound was dispersed in the solvent (N-methyl-2-pyrrolidone) to form the paste-like positive electrode compound slurry. Finally, the inner circumference side positive electrode active material layer 22 and the outer circumference side positive electrode active material layer 23 were formed by evenly applying the positive electrode compound slurry on both surfaces of the strip-like positive electrode collector 21 (aluminum foil with the thickness E: Tables 1 to 3) using a bar coater before being dried. In such a case, the single side active material layer formation region 20Z (length F (experimental values): Table 1 to 3) was formed on an end portion of the positive electrode current collector. Next, the inner circumference side positive electrode active material layer 22 and the outer circumference side positive electrode active material layer 23 were compression molded using a roll press (area densities A and B and the ratio A/(A+B) (experimental values): Tables 1 to 3). Here, the theoretical values of the ratio A/(A+B) and the length F shown in Table 1 are respectively values that are derived from Formulae 1 and 2.

Next, the negative electrode 30 was created. In such a case, after creating a cobalt tin alloy powder by alloying cobalt powder and tin powder, the cobalt tin alloy powder was dry blended by adding carbon powder. Next, 20 g of the mixture was charged into a reaction container of a planetary ball mill manufactured by Ito Seisakusho Co., Ltd. along with 400 g of corundum (diameter=9 mm). Next, after substituting the inside of the reaction container to an argon atmosphere, operating (rotation speed=250 rotations per minute, operation time=10 minutes) and pausing (pausing time=10 minutes) were repeated until the total operating time reached 30 hours. Next, after cooling the reaction container to room temperature and retrieving the reactant (SnCoC-containing material), coarse grains were removed by passing the reactant through a sieve (280 mesh).

Figure 5:
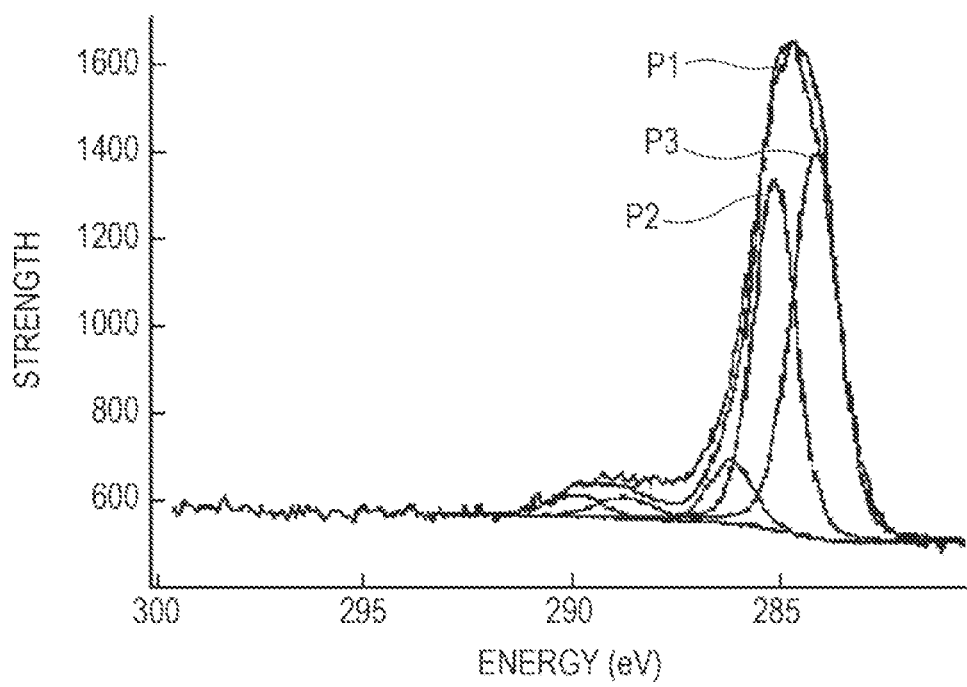
FIG. 5 is a diagram that represents an analysis result of a SnCoC-containing material by XPS.

When the composition of the obtained SnCoC-containing material was analyzed, the tin content=49.9 mass %, the cobalt content=29.3 mass %, and the carbon content=19.8 mass %. In such a case, an inductively coupled plasma (ICP) emission analysis method for the tin and cobalt contents and a carbon sulfur analyzer for the carbon content were respectively used. Further, when the SnCoC-containing material was analyzed using the X-ray diffraction method, diffraction peaks with half-value widths within a range of diffraction angle 2θ=20° to 50° were observed. Furthermore, when the SnCoC-containing material was analyzed using the XPS method, as illustrated in FIG. 5, a peak P1 was obtained. When the peak P1 was analyzed, a peak P2 of the surface contamination carbon and a peak P3 of C1s in the SnCoC-containing material on a lower energy side than the peak P2 (lower region than 284.5 eV) were obtained. From such results, it was verified that the carbon within the SnCoC-containing material was bound with the other elements.

After obtaining the SnCoC-containing material, 60 parts by mass of the negative electrode active material (SnCoC-containing material), 10 parts by mass of the negative electrode binder (polyvinylidene fluoride), and 30 parts by mass (artificial graphite=28 parts by mass, carbon black=2 parts by mass) of the negative electrode conductive agent (artificial graphite and carbon black) were mixed to form a negative electrode compound before being dispersed in a solvent (N-methyl-2-pyrrolidone) to form a negative electrode compound slurry. Next, the inner circumference side negative electrode active material layer 32 and the outer circumference side negative electrode active material layer 33 were formed by evenly applying the negative electrode compound slurry on both surfaces of the strip-like negative electrode collector 31 (aluminum foil with thickness=15 µm) using a bar coater before being dried. Finally, the inner circumference side negative electrode active material layer 32 and the outer circumference side negative electrode active material layer 33 were compression molded using a roll press. In such a case, along with the difference in the area densities A and B between the inner circumference side positive electrode active material layer 22 and the outer circumference side positive electrode active material layer 23 in the positive electrode 20, the area densities of the inner circumference side negative electrode active material layer 32 and the outer circumference side negative electrode active material layer 33 were respectively adjusted so that the balance of the charging and discharging capacity between the positive electrode 20 and the negative electrode 30 that oppose each other becomes the same. Further, in order that the lithium metal does not precipitate toward the negative electrode 30 when in a fully charged state, the charging and discharging capacity of the negative electrode 30 was made larger than the charging and discharging capacity of the positive electrode 20.

Next, after mixing ethylene carbonate (EC) and dimethyl carbonate (DMC) as the solvent, the electrolyte solution was prepared by dissolving lithium hexafluorophosphate as the electrolytic salt. In such a case, the composition of the solvent (EC:DMC) was 30:70 by volume ratio, and the density of the electrolytic salt was 1 mol/dm$^3$ (=1 mol/l).

Finally, the secondary battery was assembled using the positive electrode 20, the negative electrode 30, and the electrolyte solution. In such a case, an aluminum positive electrode lead 8 was welded to the positive electrode 20 (positive electrode collector 21), while a nickel negative electrode lead 9 was welded to the negative electrode 30 (negative electrode collector 31). Next, the positive electrode 20, the separator 41 (micro-porous polyethylene film with thickness=20 µm), the negative electrode 30, and the auxiliary separator 42 (same micro-porous polyethylene as the separator 41) were laminated in that order. Next, after coiling the laminate body several revolutions with the coiling core bar (outer diameter=inner diameter C of coil opening portion 50) as the center such that the positive electrode 20 was arranged more to the inner circumference side than the negative electrode 30, the coil opening portion 50 (inner diameter C: Tables 1 to 3) was formed by extracting the coil core rod to create the spirally wound electrode body 10 (outer diameter=17.1 mm). Next, after inserting the center pin 51 in the coil opening portion 50, the spirally wound electrode body 10 was placed in a nickel-plated iron cylindrical battery casing 1 (diameter 18 mm×height 65 mm) while being interposed by the pair of insulating plates 2 and 3. Next, while the positive electrode lead 8 was welded to the safety valve mechanism 5, the negative electrode lead 9 was welded to the battery casing 1. Finally, after injecting the electrolyte solution into the battery casing 1 by a decompression method and impregnating in the separator 41, the battery lid 4 was caulked on the battery casing 1 via the gasket 7.

Upon investigating the coiling state and the battery characteristics (battery capacity and cycle characteristics) of the secondary battery in Experiments 1 to 35, the results shown in Tables 4 and 5 were obtained.

In a case when investigating the coiling state, in order to create the spirally wound electrode body 10, after coiling the positive electrode 20 and the like with a core coil rod having the same outer diameter as the inner diameter C and leaving for some amount of time, the spirally wound body was taken apart and the occurrence of fracturing of the positive electrode 20 was ascertained by viewing. As a result, a case when there was no fracturing was marked by "○" and a case when fracturing occurred was marked by "x".

In a case when investigating the battery capacity, after measuring the discharging capacity by charging and discharging over one cycle in an atmosphere of 23° C., a standardized value (discharging capacity ratio) with the value of the discharging capacity measured in Experiment 23 as the reference (100) was ascertained. As the charging and discharging conditions, after charging by a constant current and a constant voltage to a maximum voltage 4.2 V by a current of 1C, discharging by a constant current was performed to an end voltage 2.5 V by a current of 0.2C. "1C" and "0.2C" are respectively current values that discharge the theoretical capacity in one hour and five hours.

In a case when investigating the cycle characteristics, after measuring the discharging capacity by charging and discharging over one cycle in an atmosphere of 23° C., the discharging capacity was measured by repeating charging and discharging until the total number of cycles became 300 cycles. From such a result, the capacity retention rate (%)= (discharging capacity at the 300th cycle/discharging capacity at first cycle)×100 was ascertained. With the exception of changing the current value when discharging to 1C, the charging and discharging conditions were the same as when investigating the battery capacity.

Here, although it was possible to ascertain the discharging capacity ratio and the capacity retention rate in a case when the positive electrode 20 did not fracture, since the secondary battery was not able to charge and discharge in a case when the positive electrode 20 was fractured, it was difficult to ascertain the discharging capacity ratio and the capacity retention rate.

TABLE 1

Negative Electrode Active Material: SnCoC-Containing Material

| Experiment Example | Area Density A (mg/cm$^2$) | Area Density B (mg/cm$^2$) | Ratio A/(A + B) Experimental Value | Ratio A/(A + B) Theoretical Value | Inner Diameter C (mm) | Thickness D (µm) | Thickness E (µm) | Ratio D/E | Length F (mm) Experimental Value | Length F (mm) Theoretical Value |
|---|---|---|---|---|---|---|---|---|---|---|
| 1 | 35.7 | 36.5 | 0.495 | 0.380 to 0.495 | 4 | 200 | 15 | 13.333 | 5 | 5 to 50 |
| 2 | 35.7 | 36.5 | 0.495 | 0.380 to 0.495 | 4 | 200 | 15 | 13.333 | 50 | 5 to 50 |

TABLE 1-continued

Negative Electrode Active Material: SnCoC-Containing Material

| | | | Ratio A/(A + B) | | Inner | | | | Length F (mm) | |
|---|---|---|---|---|---|---|---|---|---|---|
| Experiment Example | Area Density A (mg/cm²) | Area Density B (mg/cm²) | Experimental Value | Theoretical Value | Diameter C (mm) | Thickness D (μm) | Thickness E (μm) | Ratio D/E | Experimental Value | Theoretical Value |
| 3 | 49.8 | 61.3 | 0.448 | 0.380 to 0.448 | 4 | 300 | 15 | 20 | 25 | 25 to 50 |
| 4 | 49.8 | 61.3 | 0.448 | 0.380 to 0.448 | 4 | 300 | 15 | 20 | 50 | 25 to 50 |
| 5 | 33.9 | 38.2 | 0.470 | 0.380 to 0.472 | 2.5 | 200 | 15 | 13.333 | 5 | 5 to 50 |
| 6 | 33.9 | 38.2 | 0.470 | 0.380 to 0.472 | 2.5 | 200 | 15 | 13.333 | 50 | 5 to 50 |
| 7 | 27.4 | 44.7 | 0.380 | 0.380 to 0.472 | 2.5 | 200 | 15 | 13.333 | 5 | 5 to 50 |
| 8 | 37.7 | 44.2 | 0.460 | 0.380 to 0.461 | 2.5 | 225 | 15 | 15 | 8 | 7.5 to 50 |
| 9 | 39.5 | 48.3 | 0.450 | 0.380 to 0.455 | 2.5 | 240 | 15 | 16 | 10 | 9.8 to 50 |
| 10 | 41.2 | 50.4 | 0.450 | 0.380 to 0.450 | 2.5 | 250 | 15 | 16.667 | 13 | 11.7 to 50 |
| 11 | 41.2 | 50.4 | 0.450 | 0.380 to 0.450 | 2.5 | 250 | 15 | 16.667 | 50 | 11.7 to 50 |
| 12 | 47.6 | 63.6 | 0.428 | 0.380 to 0.428 | 2.5 | 300 | 15 | 20 | 25 | 25 to 50 |
| 13 | 47.6 | 63.6 | 0.428 | 0.380 to 0.428 | 2.5 | 300 | 15 | 20 | 50 | 25 to 50 |
| 14 | 42.2 | 68.9 | 0.380 | 0.380 to 0.428 | 2.5 | 300 | 15 | 20 | 25 | 25 to 50 |
| 15 | 33.0 | 40.3 | 0.450 | 0.380 to 0.450 | 2.5 | 200 | 12 | 16.667 | 13 | 11.7 to 50 |
| 16 | 38.1 | 50.9 | 0.428 | 0.380 to 0.428 | 2.5 | 240 | 12 | 20 | 25 | 25 to 50 |
| 17 | 44.0 | 49.6 | 0.470 | 0.380 to 0.472 | 2.5 | 260 | 20 | 13.333 | 5 | 5 to 50 |

TABLE 2

Negative Electrode Active Material: SnCoC-Containing Material

| | | | Ratio A/(A + B) | | Inner | | | | Length F (mm) | |
|---|---|---|---|---|---|---|---|---|---|---|
| Experiment Example | Area Density A (mg/cm²) | Area Density B (mg/cm²) | Experimental Value | Theoretical Value | Diameter C (mm) | Thickness D (μm) | Thickness E (μm) | Ratio D/E | Experimental Value | Theoretical Value |
| 18 | 50.4 | 58.8 | 0.461 | 0.380 to 0.461 | 2.5 | 300 | 20 | 15 | 8 | 7.5 to 50 |
| 19 | 34.6 | 37.5 | 0.480 | 0.380 to 0.480 | 3 | 200 | 15 | 13.333 | 5 | 5 to 50 |
| 20 | 34.6 | 37.5 | 0.480 | 0.380 to 0.480 | 3 | 200 | 15 | 13.333 | 50 | 5 to 50 |
| 21 | 48.3 | 62.8 | 0.435 | 0.380 to 0.435 | 3 | 300 | 15 | 20 | 25 | 25 to 50 |
| 22 | 48.3 | 62.8 | 0.435 | 0.380 to 0.435 | 3 | 300 | 15 | 20 | 50 | 25 to 50 |
| 23 | 26.3 | 26.3 | 0.500 | 0.380 to 0.518 | 4 | 150 | 15 | 10 | 0 | 18 to 50 |
| 24 | 35.7 | 36.5 | 0.495 | 0.380 to 0.495 | 4 | 200 | 15 | 13.333 | 0 | 5 to 50 |
| 25 | 35.7 | 36.5 | 0.495 | 0.380 to 0.495 | 4 | 200 | 15 | 13.333 | 100 | 5 to 50 |
| 26 | 49.8 | 61.3 | 0.448 | 0.380 to 0.448 | 4 | 300 | 15 | 20 | 20 | 25 to 50 |
| 27 | 41.3 | 50.4 | 0.450 | 0.380 to 0.450 | 2.5 | 250 | 15 | 16.667 | 10 | 11.7 to 50 |
| 28 | 47.6 | 63.6 | 0.428 | 0.380 to 0.428 | 2.5 | 300 | 15 | 20 | 22 | 25 to 50 |
| 29 | 38.9 | 72.2 | 0.350 | 0.380 to 0.428 | 2.5 | 300 | 15 | 20 | 25 | 25 to 50 |

TABLE 3

Negative Electrode Active Material: SnCoC-Containing Material

| | | | Ratio A/(A + B) | | Inner | | | | Length F (mm) | |
|---|---|---|---|---|---|---|---|---|---|---|
| Experiment Example | Area Density A (mg/cm²) | Area Density B (mg/cm²) | Experimental Value | Theoretical Value | Diameter C (mm) | Thickness D (μm) | Thickness E (μm) | Ratio D/E | Experimental Value | Theoretical Value |
| 30 | 38.1 | 50.9 | 0.428 | 0.380 to 0.428 | 2.5 | 240 | 12 | 20 | 22 | 25 to 50 |
| 31 | 50.4 | 58.8 | 0.461 | 0.380 to 0.461 | 2.5 | 300 | 20 | 15 | 0 | 7.5 to 50 |
| 32 | 26.4 | 26.2 | 0.502 | 0.380 to 0.502 | 3 | 150 | 15 | 10 | 0 | 18 to 50 |
| 33 | 34.6 | 37.5 | 0.480 | 0.380 to 0.480 | 3 | 200 | 15 | 13.333 | 0 | 5 to 50 |
| 34 | 34.6 | 37.5 | 0.480 | 0.380 to 0.480 | 3 | 200 | 15 | 13.333 | 100 | 5 to 50 |
| 35 | 48.3 | 62.8 | 0.435 | 0.380 to 0.435 | 3 | 300 | 15 | 20 | 20 | 25 to 50 |

TABLE 4

Negative Electrode Active Material: SnCoC-Containing Material

| Experiment Example | Occurrence of Fracturing | Discharge Capacity Ratio | Capacity Retention Rate (%) |
|---|---|---|---|
| 1 | ○ | 108 | 86 |
| 2 | ○ | 104 | 86 |
| 3 | ○ | 114 | 82 |
| 4 | ○ | 111 | 82 |
| 5 | ○ | 113 | 86 |
| 6 | ○ | 109 | 86 |
| 7 | ○ | 113 | 80 |
| 8 | ○ | 114 | 85 |
| 9 | ○ | 115 | 85 |
| 10 | ○ | 116 | 84 |
| 11 | ○ | 113 | 84 |
| 12 | ○ | 118 | 82 |
| 13 | ○ | 115 | 82 |
| 14 | ○ | 118 | 80 |
| 15 | ○ | 113 | 85 |
| 16 | ○ | 116 | 84 |
| 17 | ○ | 116 | 84 |
| 18 | ○ | 119 | 82 |
| 19 | ○ | 108 | 85 |
| 20 | ○ | 104 | 85 |
| 21 | ○ | 114 | 81 |
| 22 | ○ | 111 | 81 |
| 23 | ○ | 100 | 87 |
| 24 | X | — | — |
| 25 | ○ | 100 | 85 |

TABLE 5

Negative Electrode Active Material: SnCoC-Containing Material

| Experiment Example | Occurrence of Fracturing | Discharge Capacity Ratio | Capacity Retention Rate (%) |
|---|---|---|---|
| 26 | X | — | — |
| 27 | X | — | — |
| 28 | X | — | — |
| 29 | ○ | 113 | 70 |
| 30 | X | — | — |
| 31 | X | — | — |
| 32 | ○ | 86 | 87 |
| 33 | X | — | — |
| 34 | ○ | 86 | 85 |
| 35 | X | — | — |

In a case when the ratio A/(A+B) and the length F satisfy the relationship expressed in Formulae 1 and 2 (Experiments 1 to 22), favorable results were obtained as compared to a case when such conditions were not met (Experiments 23 to 35). Specifically, in the case of the former, even if the inner diameter C is decreased and the ratio D/E is increased (C=2.5 mm to 4 mm, D/E=13.333 to 20), fracturing of the positive electrode 20 was suppressed and a high discharging capacity ratio and capacity retention rate were obtained. In such a case, in particular, if the length F satisfies the relationship expressed in Formula 3, the capacity retention rate was even greater.

Experiments 36 to 43

When the coiling state and the battery characteristics were investigated by creating the secondary battery by the same techniques as in Experiments 1 to 35 with the exception of using silicon (Si) instead of the SnCoC-containing material as the negative electrode active material and setting the conditions as shown in Table 6, the results shown in Table 7 were obtained. Here, in a case when investigating the battery capacity, the discharging capacity ratio was ascertained with the value of the discharging capacity measured in Experiment 39 as the reference (100).

TABLE 6

Negative Electrode Active Material: Si

| Experiment Example | Area Density A (mg/cm²) | Area Density B (mg/cm²) | Ratio A/(A + B) Experimental Value | Theoretical Value | Inner Diameter C (mm) | Thickness D (μm) | Thickness E (μm) | Ratio D/E | Length F (mm) Experimental Value | Theoretical Value |
|---|---|---|---|---|---|---|---|---|---|---|
| 36 | 27.1 | 30.6 | 0.470 | 0.380 to 0.472 | 2.5 | 160 | 12 | 13.333 | 5 | 5 to 50 |
| 37 | 21.9 | 35.8 | 0.380 | 0.380 to 0.472 | 2.5 | 160 | 12 | 13.333 | 5 | 5 to 50 |
| 38 | 38.2 | 50.7 | 0.428 | 0.380 to 0.428 | 2.5 | 240 | 12 | 20 | 25 | 25 to 50 |
| 39 | 21.1 | 21.1 | 0.500 | 0.380 to 0.518 | 4 | 120 | 12 | 10 | 0 | 18 to 50 |
| 40 | 28.9 | 28.9 | 0.500 | 0.380 to 0.495 | 4 | 160 | 12 | 13.333 | 0 | 5 to 50 |
| 41 | 40.9 | 48.0 | 0.460 | 0.380 to 0.448 | 4 | 240 | 12 | 20 | 25 | 25 to 50 |
| 42 | 40.0 | 48.9 | 0.450 | 0.380 to 0.448 | 4 | 240 | 12 | 20 | 20 | 25 to 50 |
| 43 | 28.3 | 29.4 | 0.490 | 0.380 to 0.472 | 2.5 | 160 | 12 | 13.333 | 5 | 5 to 50 |

TABLE 7

Negative Electrode Active Material: Si

| Experiment Example | Occurrence of Fracturing | Discharge Capacity Ratio | Capacity Retention Rate (%) |
|---|---|---|---|
| 36 | ○ | 108 | 83 |
| 37 | ○ | 108 | 80 |
| 38 | ○ | 116 | 81 |
| 39 | ○ | 100 | 83 |
| 40 | X | — | — |
| 41 | X | — | — |
| 42 | X | — | — |
| 43 | X | — | — |

Even when the type of the negative electrode active material was changed, the same results as in Tables 1 to 5 were obtained. Specifically, in a case when the ratio A/(A+B) and the length F respectively satisfy the relationships expressed in Formulae 1 and 2 (Experiments 36 to 38), as compared to a case when such conditions are not satisfied (Experiments 39 to 43), fracturing of the positive electrode 20 is suppressed and a high discharging capacity ratio and capacity retention rate were obtained.

From the results of Tables 1 to 7 described above, it was verified that with the secondary battery of the embodiments of the disclosure, if the area densities A and B, the inner diameter C, the thicknesses D and E, and the length F satisfy the relationships expressed in Formulae 1 and 2, regardless of the type of negative electrode active material, fracturing of the positive electrode 20 when coiling is suppressed and excellent battery characteristics are obtained.

Although the disclosure has been described above using the embodiments and examples, the disclosure is not limited to the forms described by the embodiments and the example, and various modifications are possible. For example, the secondary battery of the embodiments of the disclosure is similarly able to be applied to a secondary battery in which the capacity of the negative electrode includes a capacity by the absorption and discharging of lithium and a capacity that accompanies the precipitation dissolution of lithium and which is represented by the sum of such capacities. In such a case, while a negative electrode material that is able to absorb and discharge lithium is used as the negative electrode material, the chargeable capacity of the negative electrode material is set to be less than the dischargeable capacity of the positive electrode.

Further, although a case when the battery structure is cylindrical has been exemplified and described in the embodiments and examples, the battery structure is not limited thereto, and the secondary battery is similarly able to be applied in a case when the secondary battery has a different battery structure such as a square.

Further, although a case when lithium is used as the element of the carrier has been described in the embodiments and the examples, the carrier is not limited thereto. The carrier may, for example, be other Group 1 elements such as sodium (Na) or potassium (K), may be Group 2 elements such as magnesium or calcium, or may be other light metals such as aluminum. Since the effects of the embodiments of the disclosure are able to be obtained regardless of the type of element of the carrier, the same effects are obtained even when the type of element is changed.

Further, in the embodiments and examples, with regard to the range of the ratio A/(A+B), an appropriate range derived from the results of the examples have been described. Such a description is not to completely deny the possibility that the ratio A/(A+B) falls outside of the range described above. That is, since the appropriate range described above is merely a range that is particularly preferable in obtaining the effects of the embodiments of the disclosure, as long as the effects of the embodiments of the disclosure are obtained, the ratio A/(A+B) may deviate somewhat from the range described above. The same is also true of the length F.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a spirally wound electrode body in which a positive electrode and a negative electrode are laminated via a separator and spirally wound with a coil opening portion of the spirally wound electrode body as a center so that the positive electrode is arranged more to an inner circumference side than the negative electrode,
wherein the positive electrode includes:
an inner circumference side positive electrode active material layer formed on an inner circumference side of a positive electrode current collector;
an outer circumference side positive electrode active material layer formed on an outer circumference side of the positive electrode current collector; and
a single side active material layer formation region in which only the outer circumference side positive electrode active material layer is formed on the positive electrode collector,
wherein the single side active material layer formation region is formed on an end portion of the positive electrode current collector,
wherein a ratio A/(A+B) of an area density A (mg/cm$^2$) of the inner circumference side positive electrode active material layer and an area density B (mg/cm$^2$) of the outer circumference side positive electrode active material layer, an inner diameter C (mm) of the coil opening portion, and a ratio D/E of a thickness D (μm) of the positive electrode and a thickness E (μm) of the positive electrode collector satisfy a relationship expressed in Formula 1 below, and
a length F (mm) of the single side active material layer formation region satisfies a relationship expressed in Formula 2 below:

$$0.380 \leq A/(A+B) \leq [0.593 - 0.007 \times (D/E)] \times (0.03 \times C + 0.87) \quad \text{(Formula 1)}$$

wherein C is 2.5≤C≤4 and D/E is 13.333≤D/E≤20

$$[0.3 \times (D/E)^2 - 7 \times (D/E) + 45] \leq F \leq 50 \quad \text{(Formula 2)}.$$

2. The secondary battery according to claim 1, which satisfies a relationship expressed by Formula 3 below $$0.428 \leq A/(A+B) \leq [0.593 - 0.007 \times (D/E)] \times (0.03 \times C + 0.87) \quad \text{(Formula 3)}.$$

3. The secondary battery according to claim 1, wherein the negative electrode includes a negative electrode active material that is able to absorb and discharge an electrode reactant and the negative electrode active material is a material that includes at least one of silicon (Si) and tin (Sn) as a constituent element.

4. The secondary battery according to claim 1,
wherein the negative electrode includes a negative electrode active material that is able to absorb and discharge an electrode reactant, and
the negative electrode active material includes tin, cobalt (Co), and carbon (C) as constituent elements, and is a material in which a content of the carbon is equal to or greater than 9.9 mass % and equal to or less than 29.7 mass %, a proportion of the cobalt to the total of the tin and the cobalt is equal to or greater than 20 mass % and equal to or less than 70 mass %, and a half-value width of a diffraction peak that is obtained by X-ray diffraction is equal to or greater than 1°, wherein diffraction angle 2θ is equal to or greater than 20° and equal to or less than 50°.

5. The secondary battery according to claim 1, which is a lithium ion secondary battery.

6. A battery pack comprising:
the secondary battery according to claim 1;
a control section that controls the secondary battery; and
an outer packaging that contains the secondary battery.

7. An electronic apparatus that is moveable with the secondary battery according to claim 1 as a power source.

8. An electric tool that is moveable with the secondary battery according to claim 1 as a power source.

9. An electric vehicle that operates with the secondary battery according to claim 1 as a power source.

10. A power storage system that uses the secondary battery according to claim 1 as a power storage source.

11. The secondary battery according to claim 1, wherein the area density A of the inner circumference side positive electrode active material layer ranges from 26 to 51 mg/cm$^2$ and the area density B of the outer circumference side positive electrode active material layer ranges from 26 to 72 mg/cm$^2$.

\* \* \* \* \*